United States Patent Office 2,716,012
Patented Aug. 23, 1955

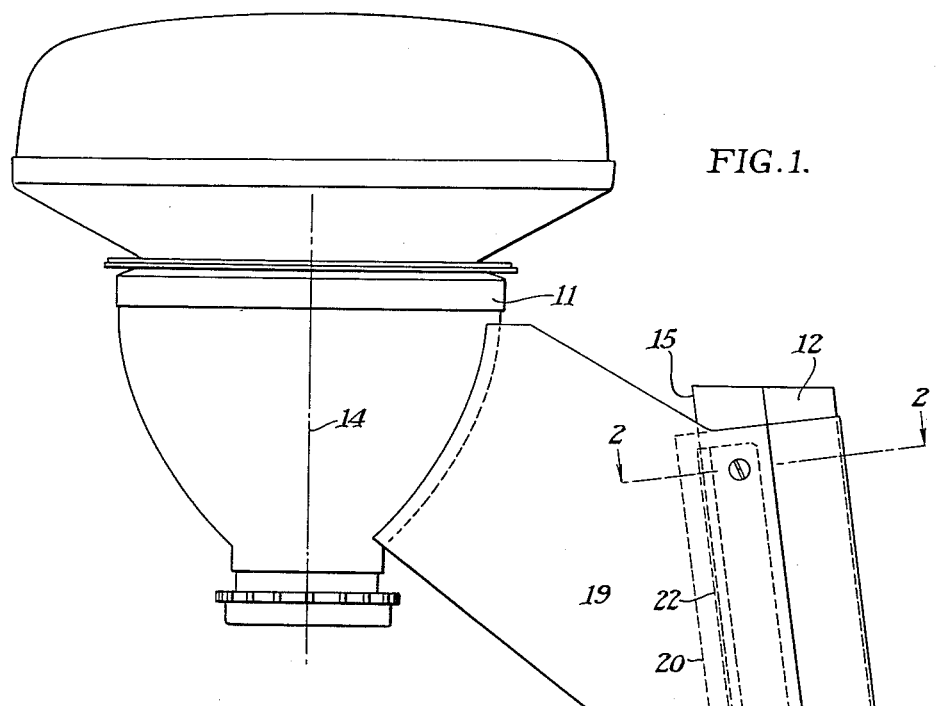
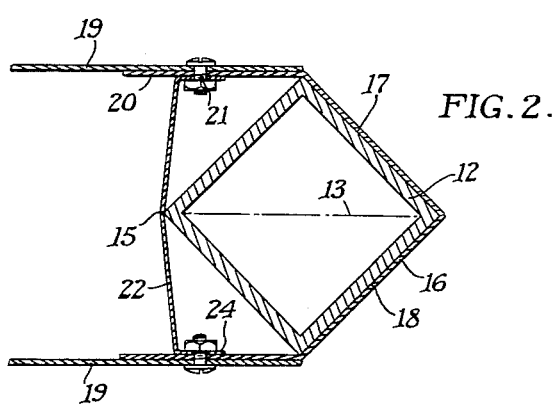
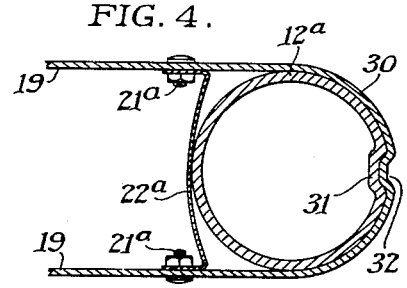
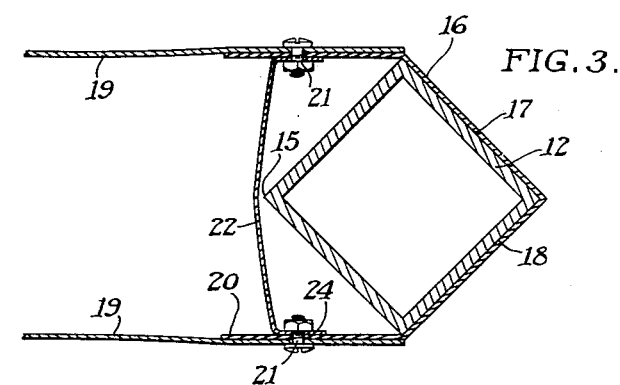
ARTHUR B. SIMMONS
INVENTOR

2,716,012

ADJUSTING AND HOLDING DEVICE

Arthur B. Simmons, Rochester, N. Y., assignor to Eastman Kodak Company, Rochester, N. Y., a corporation of New Jersey Application May 11, 1949, Serial No. 92,600

6 Claims. (Cl. 248—125)

The present invention relates to an adjusting and holding device, and more particularly to a device of this type for use in connection with photographic enlargers.

As is well known, the distance between the negative and the paper easel of an enlarger is varied to secure the desired degree of enlargement. It is highly desirable that means be provided to enable the enlarger to be readily, easily and rapidly moved to its proper position of adjustment; and, when so positioned, to be securely yet releasably retained against accidental or unintentional vertical or rotational movement.

To this end, the present invention provides an arrangement in which a bowed or flexed member cooperates with a guide member to hold the enlarger frictionally in adjusted position on a supporting post. When the enlarger position is to be changed, the bowed member is bent or flexed to release the enlarger so that it may be adjusted to the desired position. After the adjustment has been made, the flexed member or spring may be released, whereupon it moves automatically into holding relation to retain the enlarger in position.

The present invention has as its principal object a provision of a simple and effective mechanism for retaining an enlarger in adjusted position.

Still another object of the invention is the provision of a retaining mechanism of the class described which may be readily and easily released to permit adjustment of the enlarger relative to its supporting member or post.

Yet another object of the invention is the provision of a retaining mechanism which is rugged in construction, comprises few parts, easy to operate and highly effective in use.

To these and other ends, the invention resides in certain improvements and combinations of parts, all as will be hereinafter more fully described, the novel features being pointed out in the claims at the end of the specification.

In the drawings:

Fig. 1 is a side elevation view of an enlarger and a portion of its supporting member or post, showing the relation thereto of the adjusting and holding device of the present invention;

Fig. 2 is a horizontal sectional view taken substantially on line 2—2 of Fig. 1, showing the relation of the holding mechanism in its operative or holding position;

Fig. 3 is a view similar to Fig. 2 but showing the parts in the released relation to permit vertical adjustment of the enlarger, and Fig. 4 is a view similar to Fig. 3, showing a modified form of holder and positioning means of the present invention used in connection with a round supporting post.

Similar reference numerals throughout the various views indicate the same parts.

The adjusting and holding device of the present invention is adapted for use with a wide range of members which are to be moved to an adjusted position along a supporting member or post, and then held securely in adjusted position. In the present embodiment, and by way of illustration only, the device of the present invention is shown in connection with a photographic enlarger, broadly indicated by the numeral 11, which is vertically adjusted along a supporting post 12. As the enlarger may be of any suitable construction and does not per se constitute a part of the present invention, details thereof are not shown or described. In the present embodiment, the supporting post is slightly inclined, as shown in Fig. 1. In addition, the post is square in transverse cross-section, see Figs. 2 and 3, and is arranged so that a diagonal 13 thereof is substantially passing through the vertical optical axis 14 of the enlarger so that an edge 15 of the post faces the enlarger, as clearly illustrated in Figs. 2 and 3. A V-shaped or angle plate 16 engages two adjacent faces 17 and 18 of the post 12 on the side opposite the enlarger. The free end of this plate may be secured in any suitable and well-known manner to the right end of a pair of spaced plates or arms 19 formed of flexible material such, for example, as thin metal. The left ends of the arms 19 are secured to the enlarger to connect the latter to the plate 16 so that the enlarger may be connected slidably to the post 12 for adjustment therealong. It is preferred, however, to provide the free ends of the plate 16 with extensions or wings 20 which overlie the arms 19 and are connected thereto by rivets 21 or other suitable fastening means. Thus, the arms 19 and plate 16 move as a unit with the enlarger during the adjustment of the latter relative to post 12.

The plate 16 serves to position the enlarger laterally relative to the post 12 and to mount the enlarger for sliding movement along the post. It is apparent, however, that means must be provided to retain the enlarger in any selected vertical position of adjustment along the post 12, yet permit easy and ready release from the post to permit a change of adjustment of the enlarger. To secure this result, the present invention connects the arms 19, or the wings 20, with a flexible or deformable plate 22, preferably of metal, which extends across the post 12 and is adapted to engage the edge 15 opposite the faces 17 and 18, as clearly illustrated in Figs. 2 and 3. The ends of the plate 22 are bent over at 24 and are held in place by the rivets 21. The plate 22 is of sufficient strength that when in its operative position, as shown in Fig. 2, it engages the edge 15 with sufficient force to draw and retain the plate 16 into holding relation with the faces 17 and 18 of the post 12 to maintain frictionally the enlarger in any position of adjustment on the post. In addition, the engagement of the plate 16 with faces 17 and 18 serves to prevent rotation or turning of the enlarger relative to the post 12; and, in addition, positions the enlarger laterally relative to the post, all of which is deemed apparent from an inspection of the drawings.

When, however, the enlarger 11 is to be adjusted along the post, it is merely necessary to grasp the two arms 19 and press them together or towards each other. This movement will serve to decrease the space between the arms. This movement is slight, but is sufficient to bow the plate 22 to the left sufficiently to move it out of holding engagement with the edge 15, as shown in Fig. 3. When the plate 22 is thus moved, the plate 16 is released from the faces 17 and 18 sufficiently to enable the entire mechanism to be slid freely along the post to the desired position of adjustment. After the adjustment is made, the arms 19 are released, and, due to their resilient character, they return automatically to the position shown in Fig. 2, to return the plate 22 into holding engagement with the edge 15 and into cooperating relation with the plate 16 to retain the enlarger frictionally in its adjusted position. Thus, by merely grasping and pressing the arms 19 together, the enlarger is released from the post and may be adjusted therealong, but upon release of the arms the holding members move automatically into engaging relation to retain the enlarger in its adjusted position.

Fig. 4 of the drawings shows a modified construction in which the post 11 is circular rather than square, as in Figs. 1 to 3. Also, the post 12a is preferably vertical rather than inclined. In this modified structure, the arms 19 have been formed integral with, or suitably secured to, a curved or arcuate plate 30 which is adapted to engage the curved outer surface of the post 12a on the side opposite the enlarger, as is deemed apparent from an inspection of Fig. 4. The portion 30 cooperates with a bowed member or spring 22a, similar to member 22, to retain the arms 19 and, hence, the enlarger releasably and frictionally in vertical adjusted position relative to the post 12a. Due to the mechanical advantage of the system only a slight inward movement of arms 19 and a slight additional bowing of member 22a is necessary. Also, this additional bowing of the member 22 is accompanied by a slight rightward movement of the portion 30 to move the latter out of tight clamping or holding relation to the post 12a to permit the parts to slide for adjustment. Furthermore the slight rightward movement of portion 30 will provide a slight clearance between the post 12 and the points of tangency of the arms 19a to permit the arms to pivot slightly about such points of tangency without gripping the post 12a. The ends of spring 22a are secured to the arms 19 by rivets or other suitable fastening means 21a. In order to prevent rotation of the enlarger on post 12a, the latter is provided with an axially-extending keyway 31 with which a key 32 on portion 30 cooperates to provide a spline connection between the portion 30 and its supporting post.

The present invention thus provides a simple and effective means for holding the enlarger securely in any selected position of adjustment, yet enables the enlarger to be readily released and moved to any new position of adjustment when desired. The holding parts are simple and rugged in construction, inexpensive to manufacture, easy to operate and highly effective in use.

While certain embodiments of the invention have been disclosed, it is to be understood that the inventive idea may be carried out in a number of ways. This application is, therefore, not to be limited to the precise details described, but is intended to cover all variations and modifications thereof falling within the scope of the appended claims.

I claim:

1. A device for supporting a member adjustably on a standard comprising, in combination, a portion of said device wrapped around and frictionally engaging a part of the periphery of said standard, a pair of spaced resilient arms connected to said portion, and a resilient flexible element connecting said arms and engaging said standard at a point opposite said part and cooperating with said portion to retain said device frictionally in adjusted position on said standard, the movement of said arms toward each other serving to flex said element to distort said element to move the latter in a direction away from and out of engagement with said standard to free said device for movement along said standard.

2. A device for supporting a member adjustably on a standard comprising, in combination, a pair of resilient arms extending in parallel relation from diametrically opposite points of said standard, a portion of said device connecting the ends of said arms adjacent said points and engaging the periphery of said standard between said ends, and a resilient element connecting said arms and adapted to engage a part of said standard opposite that engaged by said portion and cooperating with the latter to secure said device frictionally in adjusted position on said standard, the movement of said arms toward each other serving to flex said element to move the latter out of engagement with said part to release said device for adjustment relative to said standard.

3. A device for supporting a member adjustably on a standard comprising, in combination, a pair of resilient arms extending in parallel relation from diametrically opposite points of said standard, a portion of said device connecting the ends of said arms adjacent said points and engaging the periphery of said standard between said ends, and a bowed resilient element connecting said arms and having the concave side thereof toward said standard and engaging a part of said standard opposite that engaged by said portion and cooperating with the latter to grip said standard to retain said device frictionally in adjusted position on said standard, said arms being movable toward each other to increase the bowing of said element to move the latter out of engagement with said standard to release said device to permit the latter to be adjusted relative to said standard.

4. A device for supporting a member adjustably on a standard comprising, in combination, a pair of resilient arms extending in parallel relation from diametrically opposite points of said standard, a portion of said device connecting the ends of said arms adjacent said points and engaging the periphery of said standard between said ends, and a bowed, tensioned, resilient element connecting said arms and having the concave side thereof toward said standard and engaging a part of said standard opposite that engaged by said portion and cooperating with the latter to grip said standard to retain the device frictionally in adjusted position on said standard, said arms being movable toward each other to bow said element further and to increase the tension thereof, said further bowing serving to move said element out of contact with said standard to free said device for adjustment relative to said standard, upon release of said arms said tensioned element returns the arms to their initial position and also moves said element into engagement with said standard to cooperate with said portion to retain the device in adjusted position on said standard.

5. A device for supporting a member adjustably on a standard comprising, in combination, a pair of resilient arms extending in parallel relation from diametrically opposite points of said standard, a portion of said device connecting the ends of said arms adjacent said points and engaging the periphery of said standard between said ends, a bowed, tensioned, resilient element connecting said arms and having the concave side thereof toward said standard and engaging a part of said standard opposite that engaged by said portion and cooperating with the latter to grip said standard to retain the device frictionally in adjusted position on said standard, said arms being movable toward each other to bow said element further and to increase the tension thereof, said further bowing serving to move said element out of contact with said standard to free said device for adjustment relative to said standard, upon release of said arms said tensioned element returns the arms to their initial position and also moves said element into engagement with said standard to cooperate with said portion to retain the device in adjusted position on said standard, and cooperating means on said standard and device to prevent turning of the latter relative to said standard.

6. A device for supporting a member adjustably on a standard having angularly arranged sides extending longitudinally thereof, comprising, in combination, a portion slidably engaging an adjacent pair of sides of said standard, spaced parallel resilient arms connected to the free ends of said portion, and a bowed resilient element connecting said arms and having the concave side thereof toward said standard and engaging a corner of said standard formed by a pair of adjacent sides positioned on the side of said standard opposite said first-mentioned sides, the movement of said arms toward each other imparting further deformation to said element to move the latter out of engagement with said corner to release said device to permit adjustment of the latter relative to said standard.

(References on following page)

References Cited in the file of this patent

UNITED STATES PATENTS

| | | |
|---|---|---|
| 501,392 | Wiedenmann | July 11, 1893 |
| 1,505,220 | Shay | Aug. 19, 1924 |
| 1,552,535 | Beerstecher | Sept. 8, 1925 |
| 1,757,792 | Cheslock et al. | May 6, 1930 |
| 1,826,474 | Kohler | Oct. 6, 1931 |
| 1,987,848 | Gregg | Jan. 15, 1935 |
| 2,123,695 | Elmer | July 12, 1938 |
| 2,285,850 | Weeks | June 9, 1942 |
| 2,339,564 | Goldberg et al. | Jan. 18, 1944 |

FOREIGN PATENTS

| | | |
|---|---|---|
| 117,247 | Sweden | Sept. 17, 1946 |